US010332472B2

(12) United States Patent
Shin et al.

(10) Patent No.: US 10,332,472 B2
(45) Date of Patent: Jun. 25, 2019

(54) DISPLAY DEVICE AND METHOD OF DRIVING THE SAME

(71) Applicant: SAMSUNG DISPLAY CO., LTD., Yongin, Gyeonggi-do (KR)

(72) Inventors: Yong Jin Shin, Yongin-si (KR); Tong Ill Kwak, Yongin-si (KR); Seung Hwan Moon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 281 days.

(21) Appl. No.: 15/292,451

(22) Filed: Oct. 13, 2016

(65) Prior Publication Data

US 2017/0103726 A1 Apr. 13, 2017

(30) Foreign Application Priority Data

Oct. 13, 2015 (KR) ........................ 10-2015-0142878

(51) Int. Cl.
*G06F 3/038* (2013.01)
*G09G 3/36* (2006.01)

(52) U.S. Cl.
CPC ......... *G09G 3/3696* (2013.01); *G09G 3/3688* (2013.01); *G09G 3/3607* (2013.01); *G09G 2310/0289* (2013.01); *G09G 2310/08* (2013.01); *G09G 2320/0223* (2013.01)

(58) Field of Classification Search
CPC .. G09G 3/3696; G09G 3/3688; G09G 3/3607; G09G 2320/0223; G09G 2310/08; G09G 2310/0289
See application file for complete search history.

(56) References Cited

U.S. PATENT DOCUMENTS

| | | | | |
|---|---|---|---|---|
| 8,026,989 | B2 | 9/2011 | Shin et al. | |
| 8,149,254 | B2 | 4/2012 | Kim | |
| 8,299,996 | B2 | 10/2012 | Liu et al. | |
| 8,373,730 | B2 | 2/2013 | Liu et al. | |
| 8,373,731 | B2 | 2/2013 | Liu et al. | |
| 8,674,916 | B2 | 3/2014 | Liu et al. | |
| 2005/0253797 | A1* | 11/2005 | Kamada ............ | G02F 1/133753 345/89 |
| 2008/0225036 | A1* | 9/2008 | Song .................... | G09G 3/3611 345/213 |

FOREIGN PATENT DOCUMENTS

| | | | |
|---|---|---|---|
| KR | 20060110177 | A | 10/2006 |
| KR | 100982065 | B1 | 9/2010 |
| KR | 1020120075030 | A | 7/2012 |
| KR | 101502836 | B1 | 3/2015 |

* cited by examiner

*Primary Examiner* — Nelson M Rosario
*Assistant Examiner* — Andrew Lee
(74) *Attorney, Agent, or Firm* — Cantor Colburn LLP

(57) ABSTRACT

A display device includes a display panel including a plurality of pixels, a power supply which supplies a common voltage and a distribution voltage to the display panel, and a timing controller which outputs a selection signal corresponding to image data input from the outside where the power supply supplies the distribution voltage having a value corresponding to the selection signal to the display panel.

13 Claims, 5 Drawing Sheets

DISPLAY DEVICE AND METHOD OF DRIVING THE SAME

This application claims priority to Korean Patent Application No. 10-2015-0142878, filed on Oct. 13, 2015, and all the benefits accruing therefrom under 35 U.S.C. § 119, the content of which in its entirety is herein incorporated by reference.

BACKGROUND

1. Field

Exemplary embodiments of the invention relate to a display device and a method of driving the same.

2. Description of the Related Art

A display device generally includes a display panel and a driver. The display panel includes a plurality of pixels. The driver generates various driving voltages and control signals to drive the display panel.

A driving voltage for obtaining optimal picture quality for each type of image may vary according to a type or a structure of the display device.

SUMMARY

An exemplary embodiment of the invention relates to a display device capable of securing high picture quality regardless of the type of an image and improving productivity and a method of driving the same.

A display device according to an exemplary embodiment of the invention includes a display panel including a plurality of pixels, a power supply which supplies a common voltage and a distribution voltage to the display panel, and a timing controller which outputs a selection signal corresponding to image data input from the outside. The power supply supplies the distribution voltage having a value corresponding to the selection signal to the display panel.

In an exemplary embodiment, the power supply may include first and second resistors serially connected between first and second power sources and a third resistor and a switching element serially connected between a first node between the first and second resistors and the second power source.

In an exemplary embodiment, the switching element may be turned on or off in response to the selection signal.

In an exemplary embodiment, the timing controller may include an image determining unit which receives first and second frame data corresponding to two consecutive frames, to compare the first and second frame data, and to output the selection signal.

In an exemplary embodiment, the image determining unit may include a counter which increases a count value when the first frame data is equal to the second frame data and to reset the count value when the first frame data is different from the second frame data and a selection signal generator which generates the selection signal in response to the count value.

In an exemplary embodiment, the selection signal generator may generate the selection signal at a first level when the count value is less than a predetermined reference value and generate the selection signal at a second level when the count value is equal to or greater than the predetermined reference value.

In an exemplary embodiment, the power supply may output the distribution voltage having a first value when the selection signal at the first level is supplied and output the distribution voltage having a second value when the selection signal at the second level is supplied.

In an exemplary embodiment, the first value may be larger than the second value.

In an exemplary embodiment, the timing controller may further include a frame memory in which the first and second frame data are stored.

In an exemplary embodiment, the display panel may be a resistance distribution type liquid crystal display ("LCD") panel in which each of the pixels includes a high sub-pixel and a low sub-pixel.

In an exemplary embodiment, the high sub-pixel may include a first transistor connected between a data line and a first pixel electrode and including a gate electrode connected to a gate line. The low sub-pixel may include a second transistor connected between the data line and a second pixel electrode and including a gate electrode connected to the gate line and a third transistor connected between a distribution voltage line to which the distribution voltage is applied and the second pixel electrode and including a gate electrode connected to the gate line.

A method of driving a display device according to an exemplary embodiment of the invention includes receiving first and second frame data corresponding to two consecutive frames, comparing the first and second frame data and generating a count value, generating a selection signal corresponding to the count value, outputting a distribution voltage having a value corresponding to the selection signal, and supplying the distribution voltage to a display panel.

In an exemplary embodiment, the comparing of the first and second frame data and the generating of a count value may include increasing the count value when the first frame data is equal to the second frame data and resetting the count value when the first frame data is different from the second frame data.

In an exemplary embodiment, the generating of the selection signal corresponding to the count value may include generating the selection signal at a first level when the count value is less than a predetermined reference value and generating the selection signal at a second level when the count value is equal to or greater than the predetermined reference value.

In an exemplary embodiment, the outputting of the distribution voltage having a value corresponding to the selection signal may include outputting the distribution voltage having a first value when the selection signal at the first level is input and outputting the distribution voltage having a second value smaller than the first value when the selection signal at the second level is input.

BRIEF DESCRIPTION OF THE DRAWINGS

Exemplary embodiments will now be described more fully hereinafter with reference to the accompanying drawings, in which.

DETAILED DESCRIPTION

Figure 1:
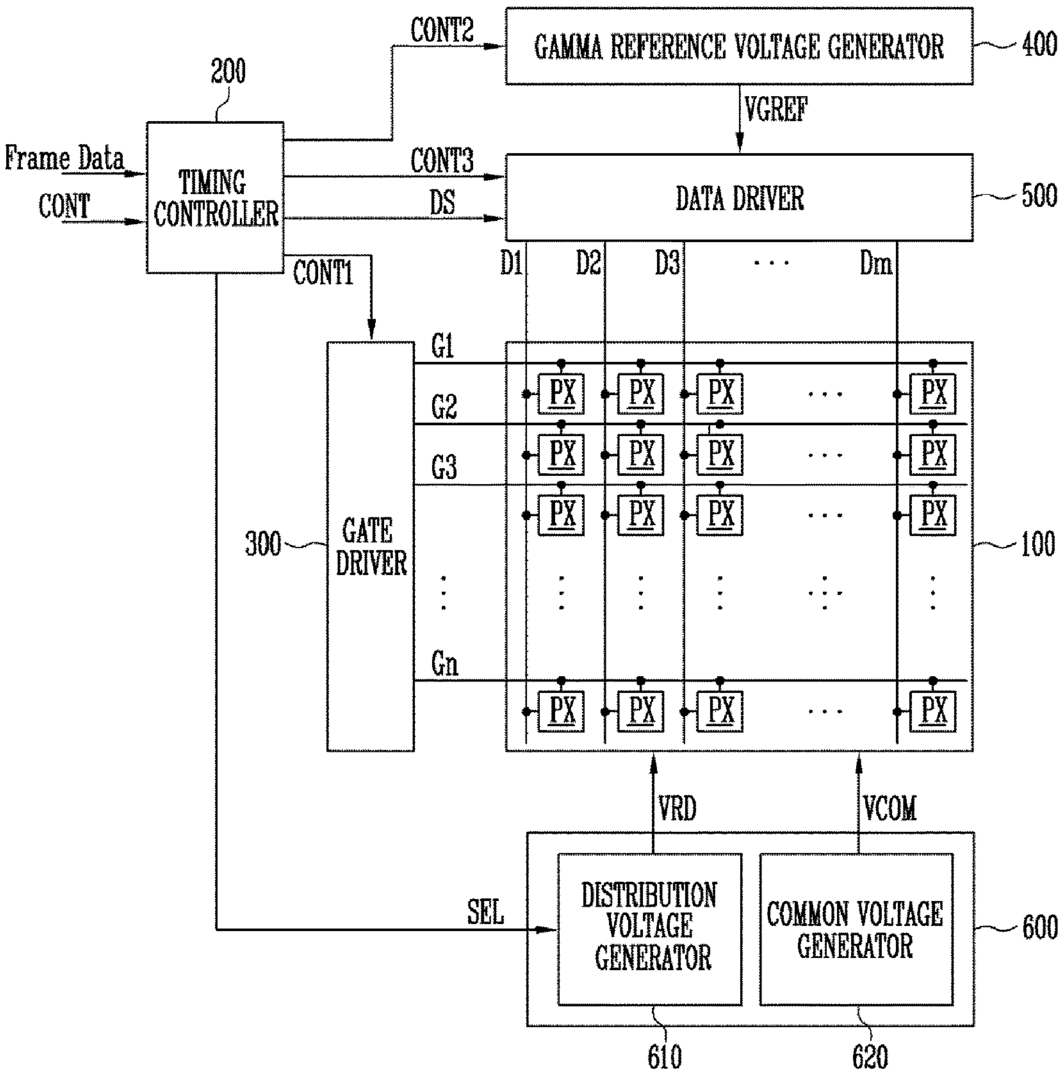
FIG. 1 is a block diagram illustrating an exemplary embodiment of a display device according to the invention.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the exemplary embodiments to those skilled in the art.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a display device according to an exemplary embodiment of the invention. In FIG. 1, it is assumed that the display device according to the exemplary embodiment of the invention is a resistance distribution type liquid crystal display ("LCD"). However, the invention is not limited thereto.

Referring to FIG. 1, the display device according to the exemplary embodiment of the invention includes a display panel 100 and a driver for driving the display panel 100. The driver includes a timing controller 200, a gate driver 300, a gamma reference voltage generator 400, a data driver 500, and a power supply 600.

The display panel 100 includes a plurality of gate lines G1 to Gn (n is a natural number) and data lines D1 to Dm (m is a natural number) and a plurality of pixels PX connected to the gate lines G1 to Gn and the data lines D1 to Dm. The display panel 100 includes red, green, and blue pixels PX and may further include white pixels PX according to an exemplary embodiment.

The pixels PX respectively receive gate signals and data signals from the corresponding gate lines G1 to Gn and data lines D1 to Dm, and emit light with brightness corresponding to the data signals.

According to an exemplary embodiment, the display panel 100 may be the resistance distribution type LCD, for example. In this case, each of the pixels PX includes a plurality of sub-pixels that display different grayscales and displays an intermediate grayscale of the sub-pixels. The resistance distribution type LCD receives a common voltage VCOM and a distribution voltage VRD to be driven and has a large view angle.

A structure of each pixel PX will be described with reference to FIG. 2.

The timing controller 200 receives image data and an input control signal CONT from an external apparatus such as a host system.

The image data may include frame data Frame Data corresponding to each frame. In an exemplary embodiment, the input control signal CONT may include vertical and horizontal synchronizing signals, for example.

The timing controller 200 generates a first control signal CONT1, a second control signal CONT2, and a third control signal CONT3 in response to the input control signal CONT.

The first control signal CONT1 is supplied to the gate driver 300 and controls operation of the gate driver 300. In an exemplary embodiment, the first control signal CONT1 may include a vertical start signal and a gate clock signal, for example.

The second control signal CONT2 is supplied to the gamma reference voltage generator 400 and controls operation of the gamma reference voltage generator 400.

The third control signal CONT3 is supplied to the data driver 500 and controls operation of the data driver 500. In an exemplary embodiment, the third control signal CONT3 may include a horizontal start signal and a load signal, for example.

In addition, the timing controller 200 transmits the received image data to the data driver 500.

According to an exemplary embodiment, the timing controller 200 generates a digital signal DS using each frame data Frame Data and may output the generated digital signal DS to the data driver 500. In an exemplary embodiment, the timing controller 200 generates the digital signal DS having high gamma or low gamma using each frame data Frame Data and may output the generated digital signal DS to the data driver 500, for example. The digital signal DS supplied to the data driver 500 is used for generating the data signals.

According to the exemplary embodiment of the invention, the timing controller 200 generates a selection signal SEL corresponding to the image data and supplies the generated selection signal SEL to the power supply 600.

Specifically, the timing controller 200 determines the type of an image using each frame data Frame Data included in the image data, and may generate the selection signal SEL having a voltage level that varies in accordance with the determined type of the image, for example, in accordance with whether the image is a still image or a moving picture. The selection signal SEL generated by the timing controller 200 is supplied to the power supply 600.

The gate driver 300 generates a gate signal in response to the first control signal CONT1 received from the timing controller 200 and sequentially outputs the generated gate signal to the gate lines G1 to Gn.

According to an exemplary embodiment, the gate driver 300 is directly disposed (e.g., mounted) on the display panel 100 or may be connected to the display panel 100 in the form of a tape carrier package ("TCP"). In an exemplary embodiment, the gate driver 300 may be integrated with a non-active region of the display panel 100.

The gamma reference voltage generator 400 generates a gamma reference voltage VGREF in response to the second control signal CONT2 received from the timing controller 200 and supplies the generated gamma reference voltage VGREF to the data driver 500.

According to an exemplary embodiment, the gamma reference voltage generator 400 may be arranged in the timing controller 200 or the data driver 500.

The data driver 500 receives the third control signal CONT3 and the digital signal DS from the timing controller 200 and receives the gamma reference voltage VGREF from the gamma reference voltage generator 400. The data driver 500 converts the digital signal DS into the data signals in the form of analog voltages using the gamma reference voltage VGREF and outputs the data signals to the data lines D1 to Dm.

According to an exemplary embodiment, the data driver 500 is directly disposed (e.g., mounted) on the display panel 100 or may be connected to the display panel 100 in the form of the TCP. In an exemplary embodiment, the data driver 500 may be integrated with the non-active region of the display panel 100.

The power supply 600 generates the common voltage VCOM and the distribution voltage VRD using a power input from the outside and supplies the common voltage VCOM and the distribution voltage VRD to the display panel 100. The common voltage VCOM and the distribution voltage VRD supplied to the display panel 100 are transmitted to each of the pixels PX.

In this regard, the power supply 600 includes a distribution voltage generator 610 and a common voltage generator 620 respectively generating the distribution voltage VRD and the common voltage VCOM.

According to an exemplary embodiment, the power supply 600 may further generate a driving power for driving at least one of the gate driver 300, the gamma reference voltage generator 400, and the data driver 500.

In an exemplary embodiment, the power supply 600 is provided in the timing controller 200 or may be separate from the timing controller 200.

According to the exemplary embodiment of the invention, the power supply 600 supplies the distribution voltage VRD corresponding to the selection signal SEL input from the timing controller 200 to the display panel 100.

In an exemplary embodiment, the power supply 600 outputs the distribution voltage VRD having a first value when the selection signal SEL at a first level is input and may output the distribution voltage VRD having a second value when the selection signal SEL at a second level is input, for example.

A voltage level of the selection signal SEL is set to vary in accordance with the type of the image. The voltage level of the selection signal SEL is set to turn on or off a switching element included in the power supply 600. In an exemplary embodiment, when the first level is set to turn off the switching element, the second level is set to turn on the switching element, for example.

Therefore, the value of the distribution voltage VRD output from the power supply 600 to the display panel 100 varies in accordance with the type of the image.

That is, according to the above-described exemplary embodiment of the invention, the type of the image is determined using the image data and the distribution voltage VRD having the value corresponding to the determined type of the image is supplied to the display panel 100.

In particular, according to the exemplary embodiment of the invention, it is determined whether a corresponding image is a moving picture or a still image using two consecutive frame data of the image data and varies the distribution voltage VRD so that picture quality may be optimized in accordance with the determined type of the image.

In an exemplary embodiment, when it is determined that the corresponding image is the moving picture, the distribution voltage VRD having the first value optimized to prevent a vertical line fault that deteriorates picture quality when the moving picture is displayed may be supplied to the display panel 100, for example.

When it is determined that the corresponding image is the still image, the distribution voltage VRD having the second value optimized to prevent an afterimage that deteriorates picture quality when the still image is displayed may be supplied to the display panel 100.

At this time, the first value and the second value that may optimize picture quality in the moving picture and the still image, respectively, are different from each other. In an exemplary embodiment, the first value may be larger than the second value, for example. In an exemplary embodiment, the first value may be set as about 10.5 volts (V) and the second value may be set as about 1.5 V, for example.

Therefore, in the display device according to a comparative example that outputs the fixed distribution voltage VRD regardless of the type of the image, it is difficult to set the distribution voltage VRD that prevents both the vertical line fault in the moving picture and the afterimage in the still image.

In the display device driven by the fixed distribution voltage VRD, according to an exemplary embodiment, the picture quality may be improved by previously performing aging in a producing process. However, in this case, transistors may deteriorate according to aging and productivity may deteriorate.

According to the exemplary embodiment of FIG. 1, both the vertical line fault of the moving picture and the afterimage of the still image may be prevented without performing aging in the producing process by varying the distribution voltage VRD in accordance with the type of the image. Therefore, according to the exemplary embodiment of the invention, it is possible to secure high picture quality regardless of the type of the image displayed on the display panel 100 and to improve productivity.

Figure 2:
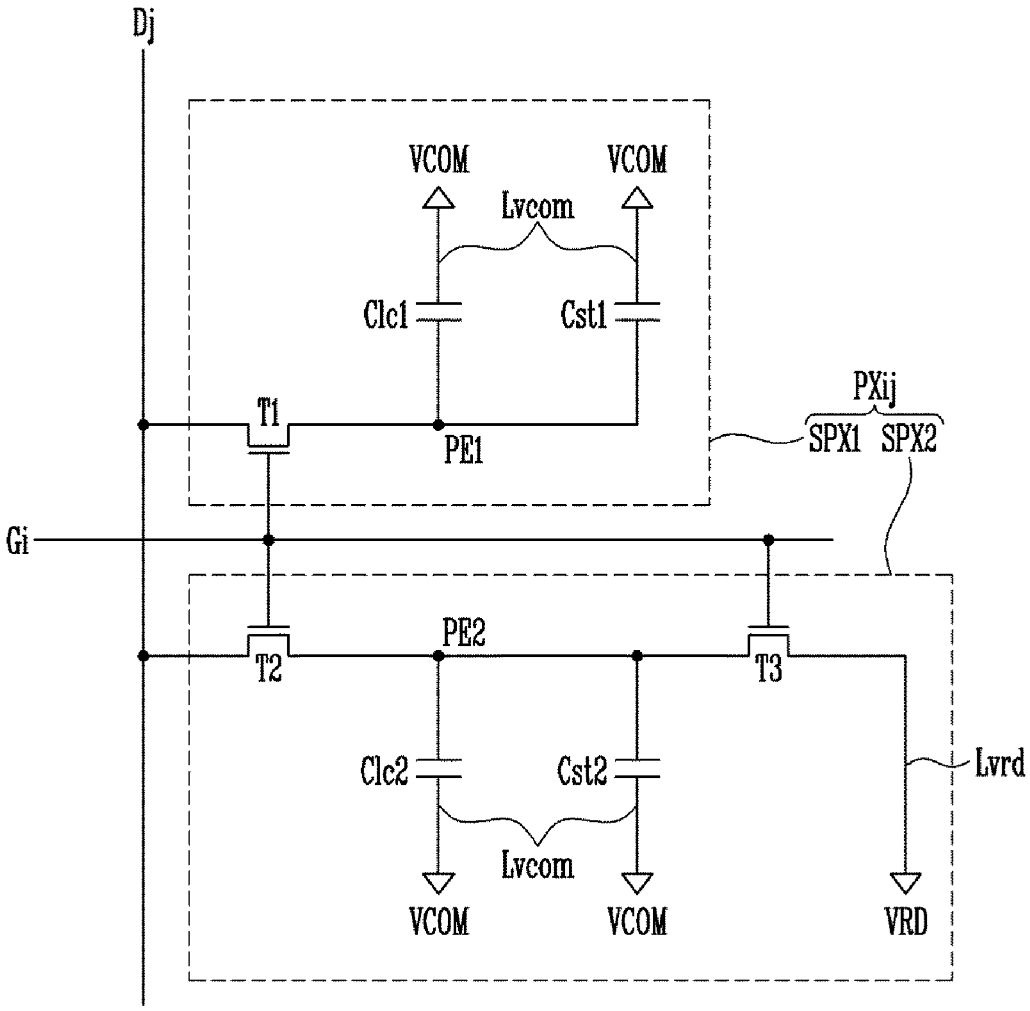
FIG. 2 is a circuit diagram illustrating an exemplary embodiment of a pixel according to the invention.

FIG. 2 is a circuit diagram illustrating a pixel according to an exemplary embodiment of the invention. In FIG. 2, an exemplary embodiment of a pixel PXij arranged in an ith (i is a natural number) horizontal line and a jth (j is a natural number) vertical line of a resistance distribution type LCD is illustrated. The invention is not limited to the display device having the pixel structure of FIG. 2.

Referring to FIG. 2, the pixel PXij may include a first sub-pixel SPX1 and a second sub-pixel SPX2 that receive the same gate signal and data signal and emit light with different grayscales. At this time, the pixel PXij may display an intermediate grayscale of the first and second sub-pixels SPX1 and SPX2.

In an exemplary embodiment, the first sub-pixel SPX1 may be a high sub-pixel that displays a higher grayscale than the second sub-pixel SPX2, for example.

The first sub-pixel SPX1 may include a first transistor T1 connected between a data line Dj and a first pixel electrode PE1 and having a gate electrode connected to a gate line Gi and a first liquid crystal capacitor Clc1 and a first storage capacitor Cst1 formed between a common voltage line Lvcom to which the common voltage VCOM is applied and the first pixel electrode PE1.

The second sub-pixel SPX2 may be a low sub-pixel that displays a lower grayscale than the first sub-pixel SPX1.

The second sub-pixel SPX2 may include a second transistor T2 connected between the data line Dj and a second pixel electrode PE2 and having a gate electrode connected to the gate line Gi, a third transistor T3 connected between a distribution voltage line Lvrd to which the distribution voltage VRD is applied and the second pixel electrode PE2 and having a gate electrode connected to the gate line Gi, and a second liquid crystal capacitor Clc2 and a second storage capacitor Cst2 formed between the common voltage line Lvcom to which the common voltage VCOM is applied and the second pixel electrode PE2.

According to the current embodiment, the common voltage VCOM is applied to the first and second storage capacitors Cst1 and Cst2 and the first and second liquid crystal capacitors Clc1 and Clc2. However, the invention is not limited thereto. In another exemplary embodiment, instead of the common voltage VCOM, the distribution voltage VRD or a third voltage may be applied to at least one of the first and second storage capacitors Cst1 and Cst2 and the first and second liquid crystal capacitors Clc1 and Clc2, for example.

When the gate signal and the data signal are supplied to the pixel PXij, a voltage of the data signal, that is, a data voltage is directly applied to the first pixel electrode PE1 via the first transistor T1.

However, in the second sub-pixel SPX2, the data voltage is distributed by the second and third transistors T2 and T3 that are substantially simultaneously turned on.

That is, a voltage between the data voltage applied via the second transistor T2 and the distribution voltage VRD applied via the third transistor T3 is applied to the second pixel electrode PE2 of the second sub-pixel SPX2. Therefore, a voltage lower than the data voltage is applied to the second pixel electrode PE2 of the second sub-pixel SPX2.

At this time, the voltage applied to the second pixel electrode PE2 is determined by the distribution voltage VRD in accordance with turn-on resistances of the second and third transistors T2 and T3 and may be determined by appearance ratios (W/L) of the second and third transistors T2 and T3.

Therefore, when the same data signal is supplied to the first and second sub-pixels SPX1 and SPX2, the first and second sub-pixels SPX1 and SPX2 display different grayscales. The pixel PXij including the first and second sub-pixels SPX1 and SPX2 displays the intermediate grayscale of the first and second sub-pixels SPX1 and SPX2.

The resistance distribution type LCD in which each pixel PXij is divided into the two sub-pixels SPX1 and SPX2 that display different grayscales to be driven has a large view angle.

Figure 3:
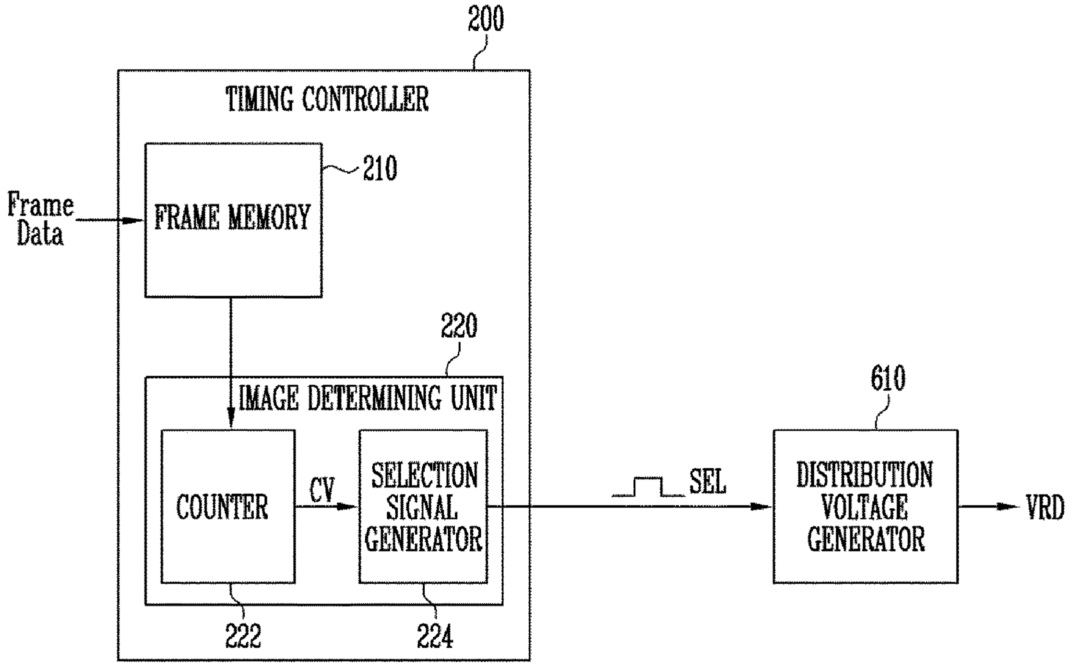
FIG. 3 is a block diagram illustrating an exemplary embodiment of a timing controller according to the invention.

FIG. 3 is a block diagram illustrating a timing controller according to an exemplary embodiment of the invention. For convenience sake, in FIG. 3, only elements required for generating the selection signal SEL are illustrated.

Referring to FIG. 3, the timing controller 200 according to the exemplary embodiment of the invention includes a frame memory 210 and an image determining unit 220.

The frame memory 210 stores each frame data Frame Data included in the image data. In an exemplary embodiment, the frame memory 210 may store first and second frame data, for example. The first and second frame data mean image data of two consecutive frames. That is, the first frame data may mean the image data corresponding to a Kth (K is a natural number) frame and the second frame data may mean the image data corresponding to a (K+1)th frame.

The image determining unit 220 receives the first and second frame data stored in the frame memory 210, compares the first and second frame data with each other to determine the type of the image, and outputs the selection signal SEL corresponding to the determined type of the image.

The image determining unit 220 may include a counter 222 and a selection signal generator 224.

The counter 222 performs counting when the first frame data is equal to the second frame data. That is, the counter 222 increases a count value CV by one when the first and second frame data are equal to each other.

When the first frame data is different from the second frame data, the counter 222 resets the count value CV. In an exemplary embodiment, when the different first and second frame data are input to the counter 222, the count value CV may be reset as "0," i.e., zero.

The selection signal generator 224 receives the count value CV from the counter 222 and generates the selection signal SEL corresponding to the count value CV.

In an exemplary embodiment, when the selection signal generator 224 generates the selection signal SEL at a first level when the count value CV is less than a predetermined reference value, and generates the selection signal SEL at a second level when the count value CV is equal to or greater than the predetermined reference value, for example. The first level and the second level are set to be different from each other. In an exemplary embodiment, when the first level is set as a low level, the second level may be set as a high level, for example.

That is, the image determining unit 220 generates the count value CV based on a result obtained by continuously comparing the first and second frame data. When the count value CV reaches a previously set reference value, the image determining unit 220 determines that the still image is displayed and varies a voltage level of the selection signal SEL.

When the count value CV does not reach the previously set reference value, the image determining unit 220 determines that the moving picture is displayed and outputs the selection signal SEL by which the distribution voltage VRD optimized for the moving picture may be output.

The selection signal SEL output by the image determining unit 220 is input to the distribution voltage generator 610. Then, the distribution voltage generator 610 generates the distribution voltage VRD having a value corresponding to the selection signal SEL and outputs the generated distribution voltage VRD.

Figure 4:
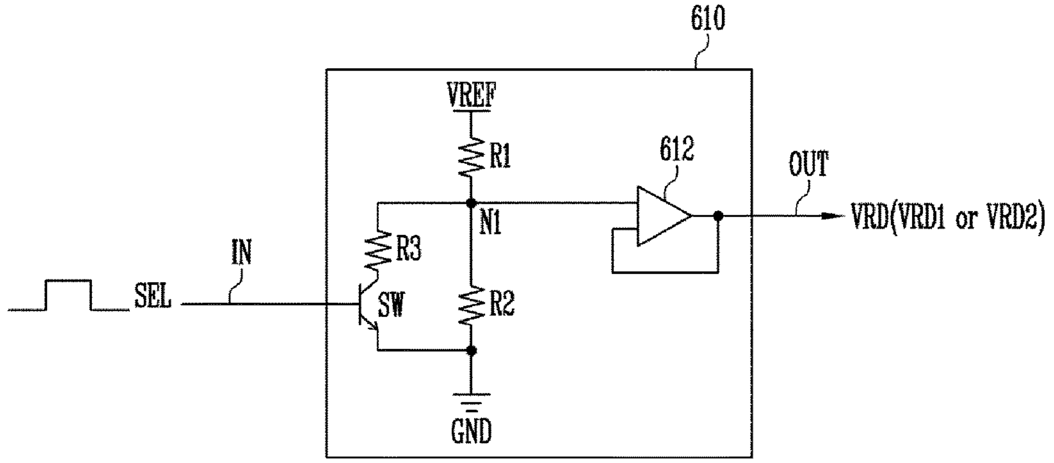
FIG. 4 is a circuit diagram illustrating an exemplary embodiment of a distribution voltage generator according to the invention.

FIG. 4 is a circuit diagram illustrating a distribution voltage generator according to an exemplary embodiment of the invention.

Referring to FIG. 4, the distribution voltage generator 610 according to the exemplary embodiment of the invention outputs a first distribution voltage VRD1 having a first value or a second distribution voltage VRD2 having a second value in response to the selection signal SEL.

In an exemplary embodiment, the distribution voltage generator 610 outputs the first distribution voltage VRD1 when the selection signal SEL at the first level (for example, the low level) is supplied and may output the second distribution voltage VRD2 when the selection signal SEL at the second level (for example, the high level) is supplied, for example.

The distribution voltage generator 610 includes first to third resistors R1 to R3 and a switching element SW. According to an exemplary embodiment, the distribution voltage generator 610 may further include an amplifier 612 connected to an output terminal OUT.

The first resistor R1 is connected between a first power source VREF and a first node N1. The first power source VREF may be a high potential reference power source used for generating the distribution voltage VRD.

The second resistor R2 is connected between the first node N1 and a second power source GND. The second power source GND may be a low potential power source for generating the distribution voltage VRD. In an exemplary embodiment, the second power source GND may be a ground power source, for example.

That is, the first and second resistors R1 and R2 are serially connected between the first and second power sources VREF and GND.

The third resistor R3 and the switching element SW are serially connected between the first node N1 between the first and second resistors R1 and R2 and the second power source GND. That is, the third resistor R3 and the switching element SW are connected to the second resistor R2 in parallel.

The switching element SW is turned on or off in response to the selection signal SEL input from the timing controller 200. In an exemplary embodiment, the switching element SW may be, for example, a transistor. In this case, a control electrode of the switching element SW may be connected to an input terminal IN to which the selection signal SEL is input.

In an exemplary embodiment, the switching element SW may be an n-type transistor turned off in response to the selection signal SEL at the first level (e.g., the low level) and turned on in response to the selection signal SEL at the second level (e.g., the high level), for example.

When the selection signal SEL at the first level (e.g., the low level) is supplied to the input terminal IN of the distribution voltage generator 610, the switching element SW is turned off. Therefore, a voltage obtained by distributing a voltage between the first and second power sources VREF and GND by a resistance ratio between the first and second resistors R1 and R2 is applied to the first node N1. At this time, the voltage applied to the first node N1 is defined by following EQUATION 1.

$$V(N1) = \left(\frac{R2}{R1 + R2}\right) VREF \qquad \text{[EQUATION 1]}$$

Like in the exemplary embodiment of FIG. 4, when the amplifier 612 is provided in the output terminal OUT of the distribution voltage generator 610, the voltage of the first node N1 is amplified by the amplifier 612 to have the first value. Therefore, the first distribution voltage VRD1 is output to the output terminal OUT. When the amplifier 612 is omitted, the voltage between the first and second power sources VREF and GND and/or resistance values of the first and second resistors R1 and R2 are controlled so that the first distribution voltage VRD1 is output to the output terminal OUT.

When the selection signal SEL at the second level (e.g., the high level) is supplied to the input terminal IN of the distribution voltage generator 610, the switching element SW is turned on. Therefore, a voltage distributed by a resistance ratio among the first to third resistors R1 to R3 is applied to the first node N1. When the switching element SW is turned on by the selection signal SEL at the second level (e.g., the high level), a resistance between the first node N1 and the second power source GND is reduced by the third resistor R3 connected to the second resistor R2 in parallel so that the voltage of the first node N1 is reduced. In this case, the voltage applied to the first node N1 is defined by following EQUATION 2. In the EQUATION 2, R2//R3 denotes a parallel resistance between the second and third resistors R2 and R3.

$$V(N1') = \left(\frac{R2 // R3}{R1 + (R2 // R3)}\right) VREF \quad \text{[EQUATION 2]}$$

In addition, when the switching element SW is the transistor, a turn-on resistance of the switching element SW may be also reflected to the voltage of the first node N1.

The voltage of the first node N1 is amplified by the amplifier 612 to have the second value. Therefore, the second distribution voltage VRD2 is output to the output terminal OUT.

That is, the distribution voltage generator 610 according to the exemplary embodiment of the invention outputs the first distribution voltage VRD1 having the first value when the selection signal SEL at the first level (e.g., the low level) is supplied and outputs the second distribution voltage VRD2 having the second value lower than the first value when the selection signal SEL at the second level (e.g., the high level) is supplied.

Figure 5:
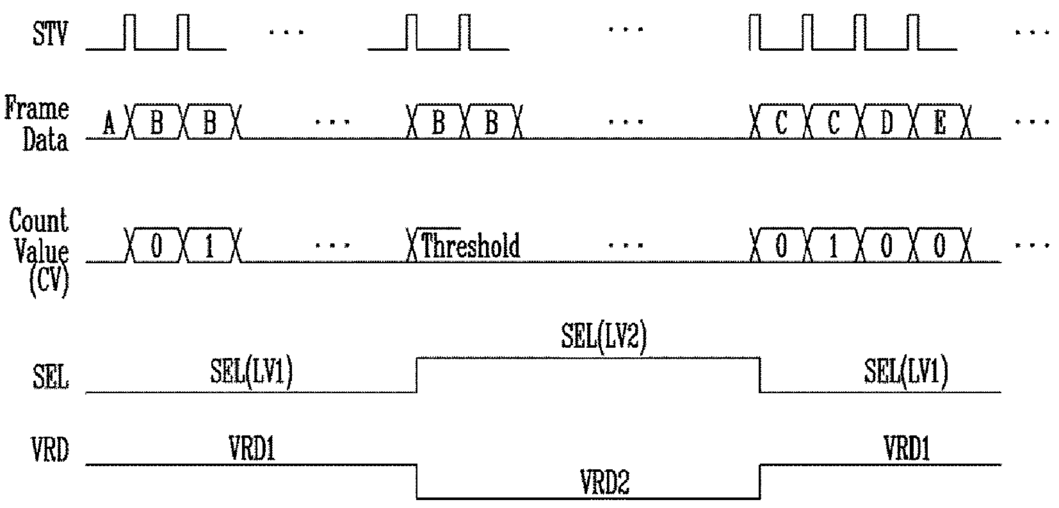
FIG. 5 is a waveform diagram illustrating an exemplary embodiment of a method of driving a display device according to the invention.

FIG. 5 is a waveform diagram illustrating a method of driving a display device according to an exemplary embodiment of the invention. Hereinafter, operations of the timing controller 200 and the distribution voltage generator 610 illustrated in FIGS. 3 and 4 will be described with reference to FIG. 5.

Referring to FIG. 5, when each frame period starts with supply of a start signal STV, frame data Frame Data of a corresponding frame is input to the timing controller 200 (refer to FIGS. 1 and 3).

The frame data Frame Data input to the timing controller 200 is stored in the frame memory 210 (refer to FIG. 3).

Then, the image determining unit 220 (refer to FIG. 3) generates the count value CV with reference to the frame memory 210 and outputs the selection signal SEL corresponding to the generated count value CV.

Specifically, the counter 222 (refer to FIG. 3) compares the two consecutive frame data, that is, the first and second frame data, increases the count value CV by one when the first and second frame data are equal to each other, and resets the count value CV as "0" when the first and second frame data are different from each other.

In an exemplary embodiment, immediately after frame data "A" is input in a previous frame, when frame data "B" is input, the count value CV is reset as "0", for example.

When the frame data "B" is input in several frame periods, the count value CV increases by one in each frame.

The count value CV generated by the counter 222 is input to the selection signal generator 224 (refer to FIG. 3).

The selection signal generator 224 outputs the selection signal at the first level SEL(LV1) when the count value CV is less than a predetermined reference value Threshold and outputs the selection signal at the second level SEL(LV2) when the count value CV reaches a predetermined reference value.

After the frame data "B" is input in the several frame periods, when frame data "C" different from immediately previous frame data is input, the count value CV is reset as "0".

The selection signal SEL generated by the selection signal generator 224 is input to the distribution voltage generator 610 (refer to FIGS. 1, 3 and 4).

The distribution voltage generator 610 generates and outputs the distribution voltage VRD having a value corresponding to the voltage level of the selection signal SEL.

In an exemplary embodiment, the distribution voltage generator 610 outputs the first distribution voltage VRD1 having the first value when the selection signal at the first level SEL(LV1) is input and outputs the second distribution voltage VRD2 having the second value when the selection signal at the second level SEL(LV2) is input, for example.

That is, according to the exemplary embodiment of the invention, when the count value CV is less than a predetermined reference value, it is determined that the moving picture is being displayed and the first distribution voltage VRD1 suitable for implementing the moving picture is output. When the count value CV is equal to or greater than the predetermined reference value, it is determined that the still image is being displayed and the second distribution voltage VRD2 suitable for implementing the still image is output.

Therefore, since the value of the distribution voltage VRD varies so as to be optimized to the type of each image, an image with high picture quality may be displayed regardless of the type of the image.

Figure 6:
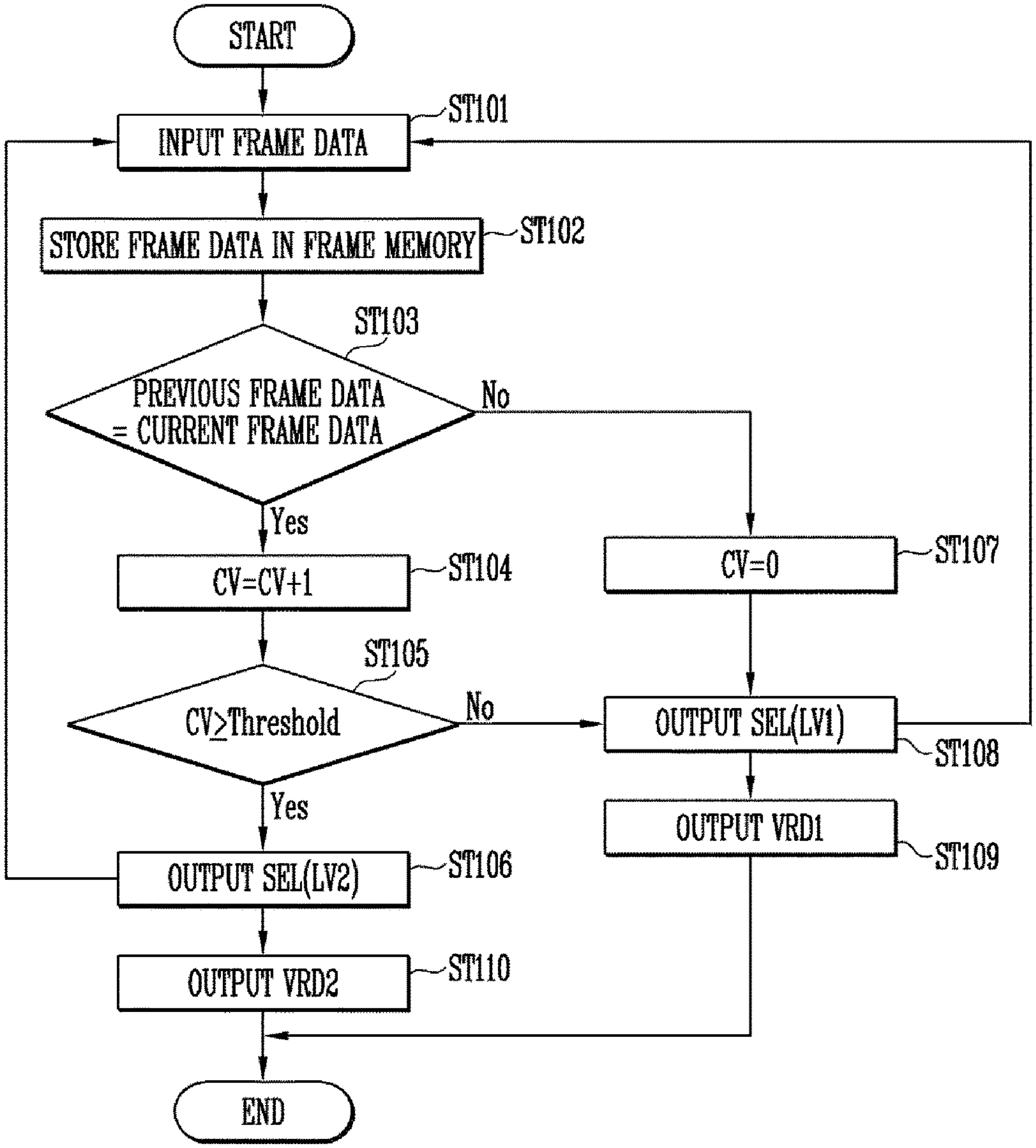
FIG. 6 is a flowchart illustrating an exemplary embodiment of a method of driving a display device according to the invention.

FIG. 6 is a flowchart illustrating a method of driving a display device according to an exemplary embodiment of the invention.

<Frame Data Input Operations: ST101 and ST102>

First, when the frame data Frame Data is input to the timing controller 200 (refer to FIGS. 1 and 3) in each frame period, the input frame data Frame Data is stored in the frame memory 210 (refer to FIG. 3).

<Count Value (CV) and Selection Signal (SEL) Generating Operation: ST103 to ST108>

When each frame data Frame Data is stored in the frame memory 210, the image determining unit 220 (refer to FIG. 3) generates the selection signal SEL using the frame data Frame Data stored in the frame memory 210.

For this purpose, the image determining unit 220 compares the two consecutive frame data, that is, the first and second frame data and generates the count value CV corresponding to the comparison result.

Specifically, when the two consecutive frame data are equal to each other, the image determining unit 220 increases the count value CV by one and, when the count value CV reaches the predetermined reference value Threshold, the image determining unit 220 generates and outputs the selection signal at the second level SEL(LV2). According to an exemplary embodiment, after the count value CV reaches the reference value, in a period in which the same frame data is continuously input, counting operation of the counter 222 (refer to FIG. 3) may temporarily stop.

When the two consecutive frame data are different from each other, the count value CV is reset as "0".

When the count value CV is set as "0" or does not reach the reference value, the image determining unit 220 generates and outputs the selection signal at the first level SEL (LV1).

<Distribution Voltage Output Operation: ST109 to ST110>

The distribution voltage generator 610 (refer to FIGS. 1, 3 and 4) generates and outputs the distribution voltage VRD having the value corresponding to the selection signal SEL.

In an exemplary embodiment, the distribution voltage generator 610 outputs the first distribution voltage VRD1 when the selection signal at the first level SEL(LV1) is input and outputs the second distribution voltage VRD2 when the selection signal at the second level SEL(LV2) is input, for example.

The distribution voltage VRD output by the distribution voltage generator 610 is supplied to the display panel 100 (refer to FIG. 1).

Through the above-described processes, according to the exemplary embodiment of the invention, the distribution voltage VRD varies in accordance with the type of the image. Such a function of varying the distribution voltage VRD may be designed to be automatically performed in a display-on state and to be automatically stopped in a display-off state. However, the invention is not limited thereto. In an exemplary embodiment, the function of varying the distribution voltage VRD may be designed to be selectively turned on/off, for example.

By way of summation and review, a driving voltage for obtaining optimal picture quality for each type of image may vary according to the type or structure of a display device. In an exemplary embodiment, in a resistance distribution type LCD, a distribution voltage VRD at which picture quality may be optimized when a moving picture is displayed may be different from a distribution voltage VRD at which picture quality may be optimized when a still image is displayed, for example.

In the display device and the method of driving the same according to the exemplary embodiment of the invention, the type of an image is determined using image data and a distribution voltage VRD having a value corresponding to the determined type of the image is supplied to the display panel 100.

In particular, according to the invention, it is determined whether a corresponding image is a moving picture or a still image using two consecutive frame data of the image data and the distribution voltage VRD is varied in accordance with the determined type of the image so that picture quality may be optimized.

Therefore, vertical line fault of the moving picture and an afterimage of the still image may be prevented without performing aging in a producing process. According to the invention, high picture quality may be secured regardless of the type of the image displayed on the display panel 100 and productivity may be improved.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:

a display panel including a plurality of pixels;

a power supply which supplies a common voltage and a distribution voltage to the display panel; and a timing controller which outputs a selection signal corresponding to image data input from an outside, wherein the power supply supplies the distribution voltage having a value corresponding to the selection signal to the display panel, wherein the timing controller comprises an image determining unit which receives first and second frame data corresponding to two consecutive frames, compares the first and second frame data, and outputs the selection signal, and wherein the image determining unit comprises:

a counter which increases a count value when the first frame data is equal to the second frame data and resets the count value when the first frame data is different from the second frame data; and a selection signal generator which generates the selection signal in response to the count value.

2. The display device of claim 1, wherein the power supply comprises:

first and second resistors serially connected between first and second power sources; and a third resistor and a switching element serially connected between a first node between the first and second resistors and the second power source.

3. The display device of claim 2, wherein the switching element is turned on or off in response to the selection signal.

4. The display device of claim 1, wherein the selection signal generator generates the selection signal at a first level when the count value is less than a predetermined reference value and generates the selection signal at a second level when the count value is equal to or greater than the predetermined reference value.

5. The display device of claim 4, wherein the power supply outputs the distribution voltage having a first value when the selection signal at the first level is supplied and outputs the distribution voltage having a second value when the selection signal at the second level is supplied.

6. The display device of claim 5, wherein the first value is larger than the second value.

7. The display device of claim 1, wherein the timing controller further comprises a frame memory in which the first and second frame data are stored.

8. The display device of claim 1, wherein the display panel is a resistance distribution type liquid crystal display panel in which each of the plurality of pixels comprises a high sub-pixel and a low sub-pixel.

9. The display device of claim 8, wherein the high sub-pixel comprises a first transistor connected between a data line and a first pixel electrode and including a gate electrode connected to a gate line, wherein the low sub-pixel comprises:

a second transistor connected between the data line and a second pixel electrode and including a gate electrode connected to the gate line; and a third transistor connected between a distribution voltage line to which the distribution voltage is applied and the second pixel electrode and including a gate electrode connected to the gate line.

10. A method of driving a display device, the method comprising:

receiving first and second frame data corresponding to two consecutive frames;

comparing the first and second frame data and generating a count value;

generating a selection signal corresponding to the count value;

outputting a distribution voltage having a value corresponding to the selection signal; and supplying the distribution voltage to a display panel.

11. The method of claim 10, wherein the comparing the first and second frame data and the generating the count value comprises increasing the count value when the first frame data is equal to the second frame data and resetting the count value when the first frame data is different from the second frame data.

12. The method of claim 10, wherein the generating the selection signal corresponding to the count value comprises generating the selection signal at a first level when the count value is less than a predetermined reference value and generating the selection signal at a second level when the count value is equal to or greater than the predetermined reference value.

13. The method of claim 12, wherein the outputting the distribution voltage having the value corresponding to the selection signal comprises outputting the distribution voltage having a first value when the selection signal at the first level is input and outputting the distribution voltage having a second value smaller than the first value when the selection signal at the second level is input.

* * * * *